United States Patent
Pan et al.

(10) Patent No.: US 8,767,241 B2
(45) Date of Patent: Jul. 1, 2014

(54) PRINT SERVICES SELECTION IN A NETWORKED COMPUTING ENVIRONMENT

(75) Inventors: Tian Ming Pan, Shanghai (CN); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 13/366,666

(22) Filed: Feb. 6, 2012

(65) Prior Publication Data

US 2013/0201518 A1 Aug. 8, 2013

(51) Int. Cl.
*G06F 15/00* (2006.01)
*G06F 3/12* (2006.01)
*G06K 1/00* (2006.01)
*G06K 15/00* (2006.01)

(52) U.S. Cl.
CPC .............. *G06F 3/1226* (2013.01); *G06F 3/126* (2013.01); *G06K 15/00* (2013.01)
USPC .......................................... 358/1.15; 358/1.1

(58) Field of Classification Search
CPC ........ G06F 3/1226; G06F 3/126; G06K 15/00
USPC ......................................... 358/1.1, 1.13, 1.15
See application file for complete search history.

(56) References Cited

U.S. PATENT DOCUMENTS

| | | | |
|---|---|---|---|
| 6,822,754 B1 * | 11/2004 | Shiohara ...................... | 358/1.15 |
| 8,312,660 B1 * | 11/2012 | Fujisaki ........................ | 42/70.11 |
| 2010/0073707 A1 | 3/2010 | Ferlitsch | |
| 2010/0302579 A1 | 12/2010 | Nuggehalli et al. | |
| 2011/0007347 A1 | 1/2011 | Kamath et al. | |
| 2011/0188063 A1 | 8/2011 | Nuggehalli et al. | |
| 2011/0194140 A1 | 8/2011 | Sweet et al. | |
| 2011/0299110 A1 | 12/2011 | Jazayeri et al. | |

OTHER PUBLICATIONS

Maitland, J., "Keeping Control Isn't Easy", Chapter 4: Cloud-Based Infrastructure, SearchCloudComputing.com, 13 pages.
Mell et al., "The NIST Definition of Cloud Computing", National Institute of Standards and Technology, Information Technology Laboratory, Version 15, Oct. 7, 2009, 2 pages.
Paul, I., "Google Cloud Print: A hands-on-tour", IT World, Jan. 25, 2011, 3 pages. http://www.itworld.com/saas/134691/google-cloud-print-a-hands-on-tour.

\* cited by examiner

*Primary Examiner* — Douglas Tran
(74) *Attorney, Agent, or Firm* — William E. Schiesser; Keohane & D Alessandro

(57) ABSTRACT

Embodiments of the present invention provide an approach for selection of print services in a networked computing environment (e.g., a cloud computing environment). Specifically, in a typical embodiment, a request (e.g., comprising a print job) is received from a user, and a print template is identified. The print template generally comprises a set of parameters (e.g., paper size, colors, etc.) for printing the print job request. A location of the user will be determined, and a set of printers (e.g., within a predetermined proximity of the location) that is capable of printing the job in accordance with the set of parameters is identified. Thereafter, a particular printer will be identified from the set of printers based on a set of service level commitments (e.g., a desired distance from the location, a queue length, etc.). The job can then be sent to the particular printer for printing.

25 Claims, 7 Drawing Sheets

PRINT SERVICES SELECTION IN A NETWORKED COMPUTING ENVIRONMENT

TECHNICAL FIELD

Embodiments of the present invention generally relate to printer selection. Specifically, embodiments of the present invention relate to print services selection in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Print services (e.g., print cloud services) are typically focused on providing remote access to a set of printers (e.g., for a specific user or user set). Some print services may provide access from multiple client systems to a home print environment, while other enterprise environments may have a set of network printers configured and accessed directly when printing is desired. Challenges may exist, however, in providing optimal printer selection when multiple options are available. As a result, a user may need to wait until a lengthy print queue is processed before his/her job is printed and/or utilize a printer that is more distant than is desired.

SUMMARY

Embodiments of the present invention provide an approach for selection of print services in a networked computing environment (e.g., a cloud computing environment). Specifically, in a typical embodiment, a request (e.g., comprising a print job) is received from a user, and a print template is identified. The print template generally comprises a set of parameters (e.g., paper size, colors, etc.) for printing the print job request. A location of the user will be determined, and a set of printers (e.g., within a predetermined proximity of the location) that is capable of printing the job in accordance with the set of parameters is identified. Thereafter, a particular printer will be identified from the set of printers based on a set of service level commitments (e.g., a desired distance from the location, a queue length, etc.). The job can then be sent to the particular printer for printing.

A first aspect of the present invention provides a computer-implemented method for selecting print resources in a networked computing environment, comprising: receiving a request for printing a job from a user, the request received into a computer memory medium; identifying a print template to associate with the job, the print template comprising a set of parameters for printing the job; identifying a location of the user; identifying a set of printers, within a predetermined proximity of the location, that is capable of printing the job in accordance with the set of parameters; selecting a particular printer from the set of printers based on a distance of the particular printer from the location and a set of service level commitments; and sending the job to the particular printer.

A second aspect of the present invention provides a system for selecting print resources in a networked computing environment, comprising: a memory medium comprising instructions; a bus coupled to the memory medium; and a processor coupled to the bus that when executing the instructions causes the system to: receive a request for printing a job from a user, the request received into a computer memory medium; identify a print template to associate with the job, the print template comprising a set of parameters for printing the job; identify a location of the user; identify a set of printers, within a predetermined proximity of the location, that is capable of printing the job in accordance with the set of parameters; select a particular printer from the set of printers based on a distance of the particular printer from the location and a set of service level commitments; and send the job to the particular printer.

A third aspect of the present invention provides a computer program product for selecting print resources in a networked computing environment, the computer program product comprising: a computer readable storage media, and program instructions stored on the computer readable storage media, to: receive a request for printing a job from a user, the request received into a computer memory medium; identify a print template to associate with the job, the print template comprising a set of parameters for printing the job; identify a location of the user; identify a set of printers, within a predetermined proximity of the location, that is capable of printing the job in accordance with the set of parameters; select a particular printer from the set of printers based on a distance of the particular printer from the location and a set of service level commitments; and send the job to the particular printer.

A fourth aspect of the present invention provides a method for deploying a system for selecting print resources in a networked computing environment, comprising: providing a computer infrastructure being operable to: receive a request for printing a job from a user, the request received into a computer memory medium; identify a print template to associate with the job, the print template comprising a set of parameters for printing the job; identify a location of the user; identify a set of printers, within a predetermined proximity of the location, that is capable of printing the job in accordance with the set of parameters; select a particular printer from the set of printers based on a distance of the particular printer from the location and a set of service level commitments; and send the job to the particular printer.

BRIEF DESCRIPTION OF THE DRAWINGS

These and other features of this invention will be more readily understood from the following detailed description of the various aspects of the invention taken in conjunction with the accompanying drawings in which.

Figure 1:
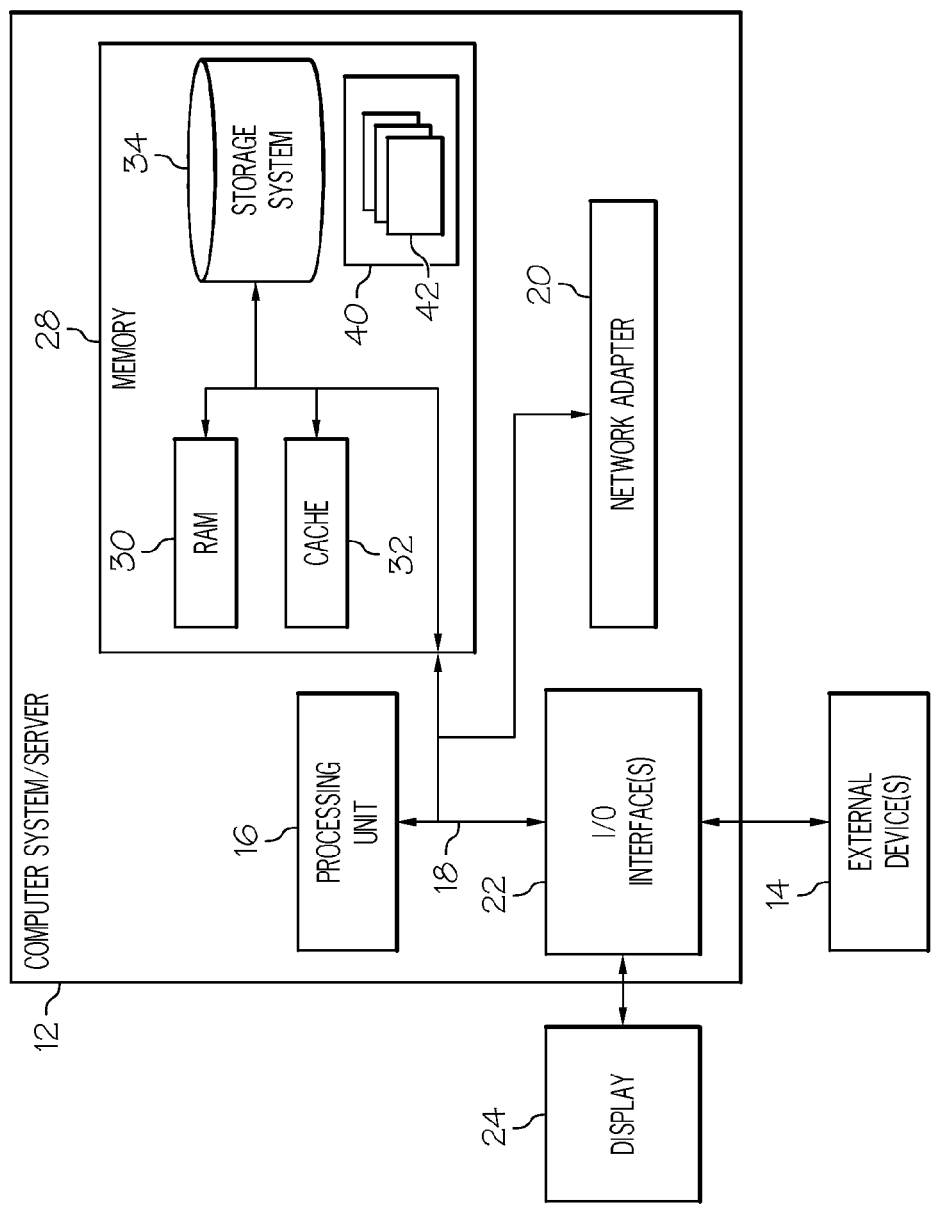
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for selection of print services in a networked computing environment (e.g., a cloud computing environment). Specifically, in a typical embodiment, a request (e.g., comprising a print job) is received from a user, and a print template is identified. The print template generally comprises a set of parameters (e.g., paper size, colors, etc.) for printing the print job request. A location of the user will be determined, and a set of printers (e.g., within a predetermined proximity of the location) that is capable of printing the job in accordance with the set of parameters is identified. Thereafter, a particular printer will be identified from the set of printers based on a set of service level commitments (e.g., a desired distance from the location, a queue length, etc.). The job can then be sent to the particular printer for printing.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
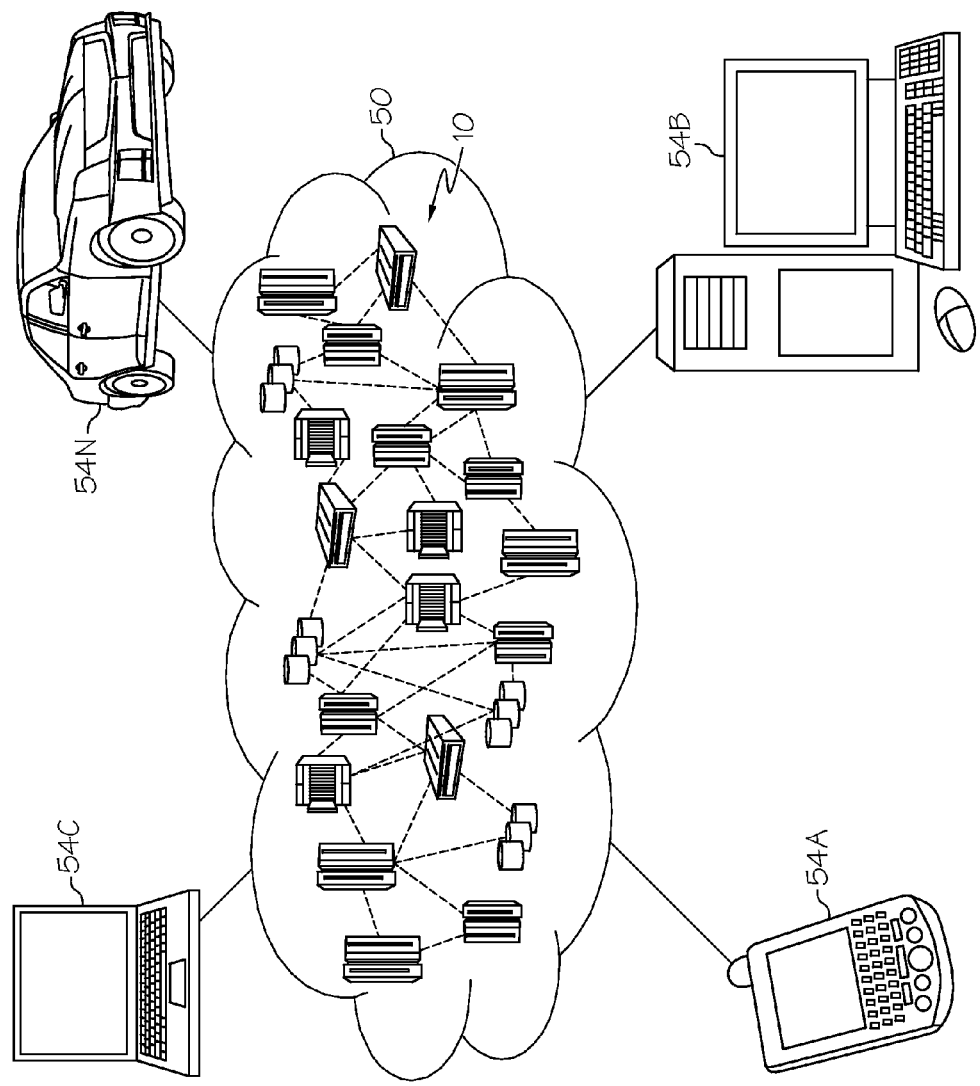
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
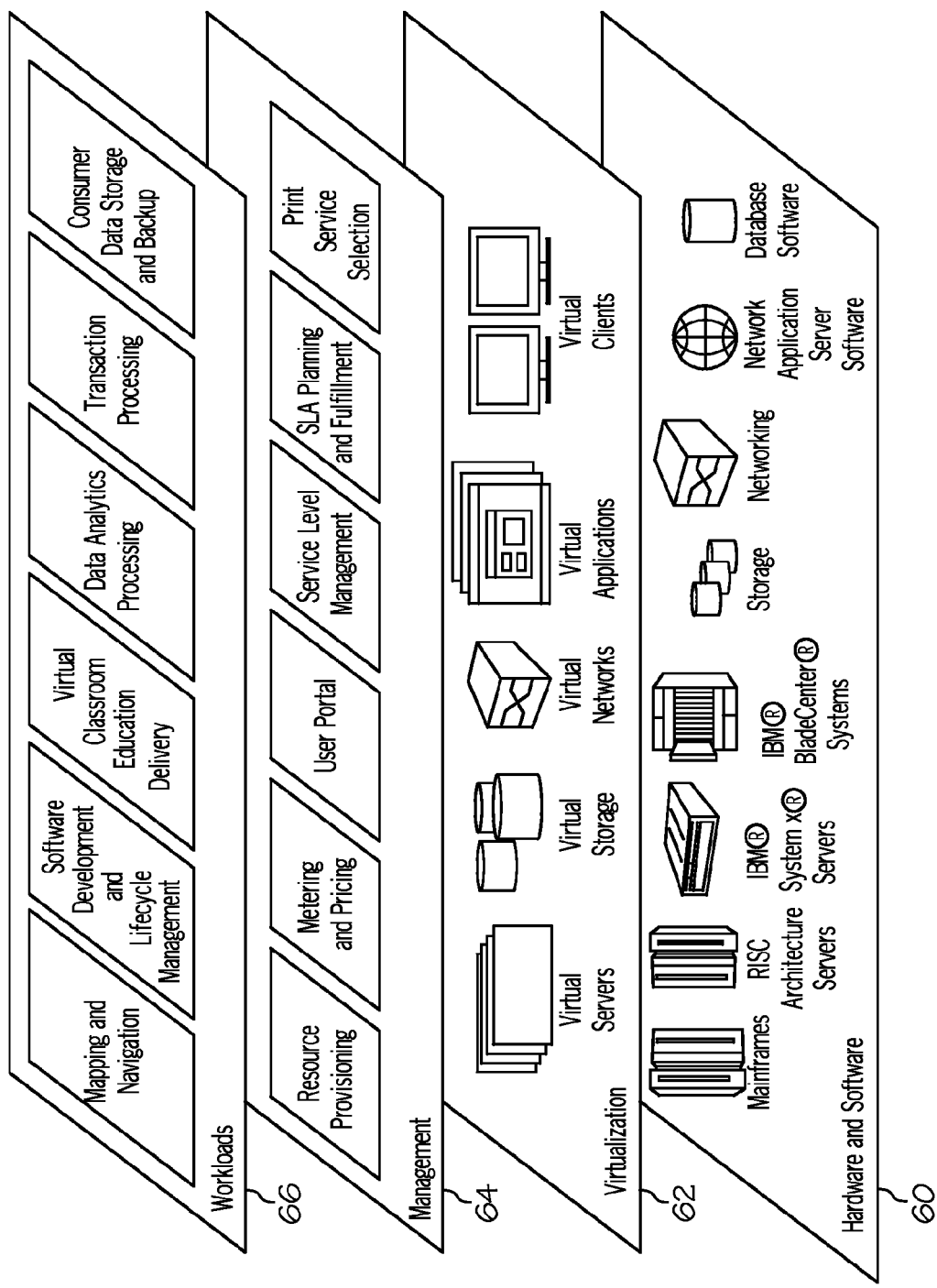
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is print service selection, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the print service selection functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
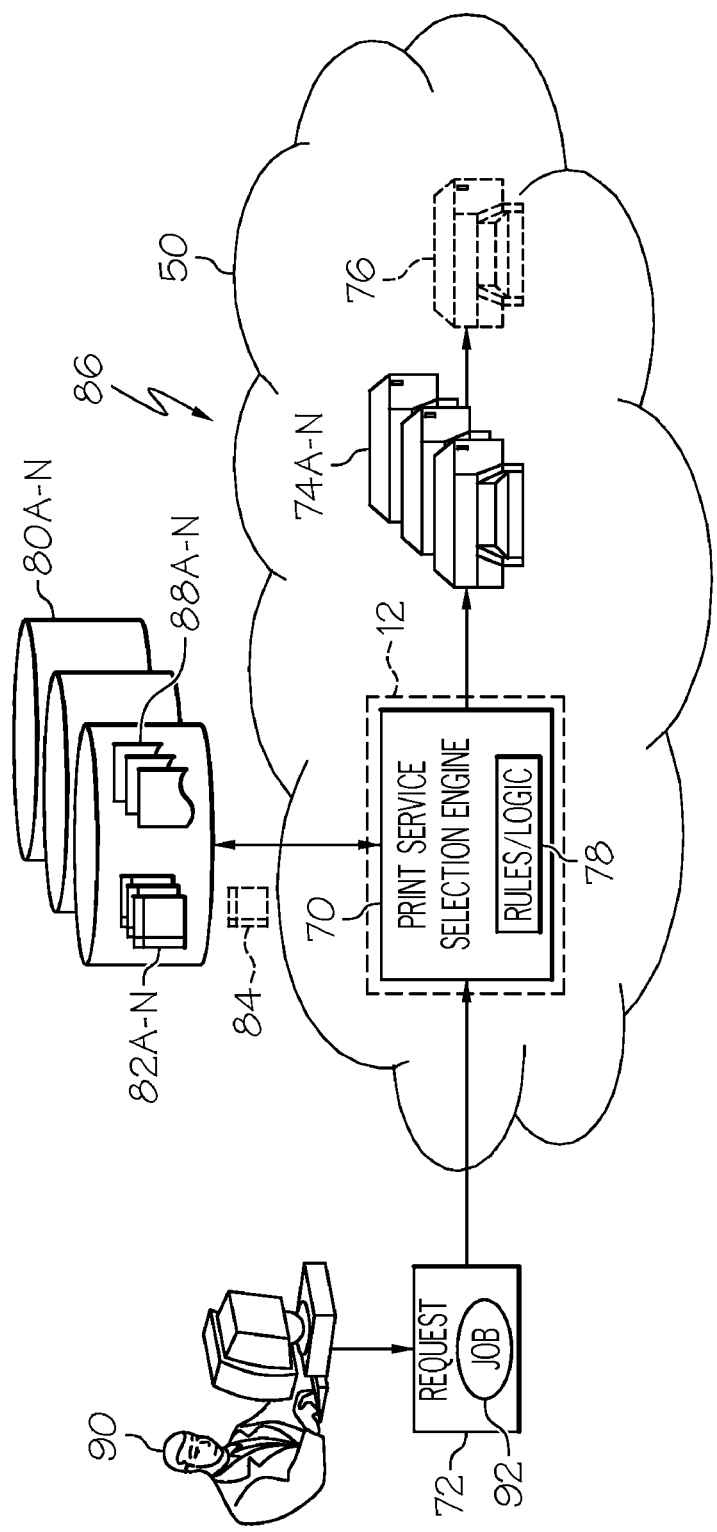
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A stand-alone computer system/server 12 is shown in FIG. 4 for illustrative purposes only. In the event the teachings recited herein are practiced in a networked computing environment 86, each client need not have a print service selection engine (engine 70). Rather, engine 70 could be loaded on a server or server-capable device that communicates (e.g., wirelessly) with the clients to print service selection therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules and/or logic 78 and/or provides print services selection hereunder.

Along these lines, engine 70 may perform multiple functions similar to a general-purpose computer. Specifically, among other functions, engine 70 may (among other things): receive a request 72 for printing a job 92 from a user 90 in a computer memory medium (e.g., memory 40 of FIG. 1); identify a print template 84 (e.g., from a set/library of print templates 82A-N stored in one or more computer storage devices 80A-N or defined by user 90) to associate with the job 92, the print template 84 generally comprising a set of parameters (e.g., a paper size, a page orientation, a page setup, a font type, or a color) for printing the job 92; identify a location of the user 90; identify a set of printers 74A-N (e.g., within a predetermined proximity of the location,) that is capable of printing the job 92 in accordance with the set of parameters; select a particular printer 76 from the set of printers 74A-N based on a distance of the particular printer from the location (e.g., as predefined by the user 90) and a set of service level commitments 88A-N (e.g., a time limit for printing the job with the particular printer 76, a queue length of the particular printer 76, etc.) stored in one or more computer storage devices 80A-N; and send the job 92 to the particular printer 76.

Embodiments of the present invention thus provide an approach that enables a system (e.g., a print cloud) to accept requests for printing, and provide printer selection optimized based on both an underlying print job and the user making the request. As indicated above, a length of a print queue, an availability status, and the proximity (both physical location and access security) are used to determine which printer will most effectively satisfy the request (e.g., even to the point of balancing the cost of various printers per sheet to minimize cost when other factors are equal).

Illustrative Example

The following section describes an illustrative example for implementing the teachings recited herein. It is understood that this illustrative example is only one way of carrying out the teachings of the present invention. Along these lines, this example utilizes the flow diagram of FIGS. 5-6 that outline an embodiment of the invention that focuses on printer selection based on business factors, paper options, printer options, and location. It is understood that these factors are not intended to be exhaustive and that other options may exist such as cost of printing (e.g., per page), printer access requirements (e.g., query the user before printing behind a combination lock or in a badge access environment per policy), printer status (e.g., printer jammed, offline, ready, etc). Moreover, although the illustrative example set forth in FIGS. 5-6 pertain to a cloud computing environment and print cloud services, this need not be the case. Rather, the underlying teachings set forth in FIGS. 5-6 could be implemented in conjunction with any type of networked computing environment.

Figure 5:
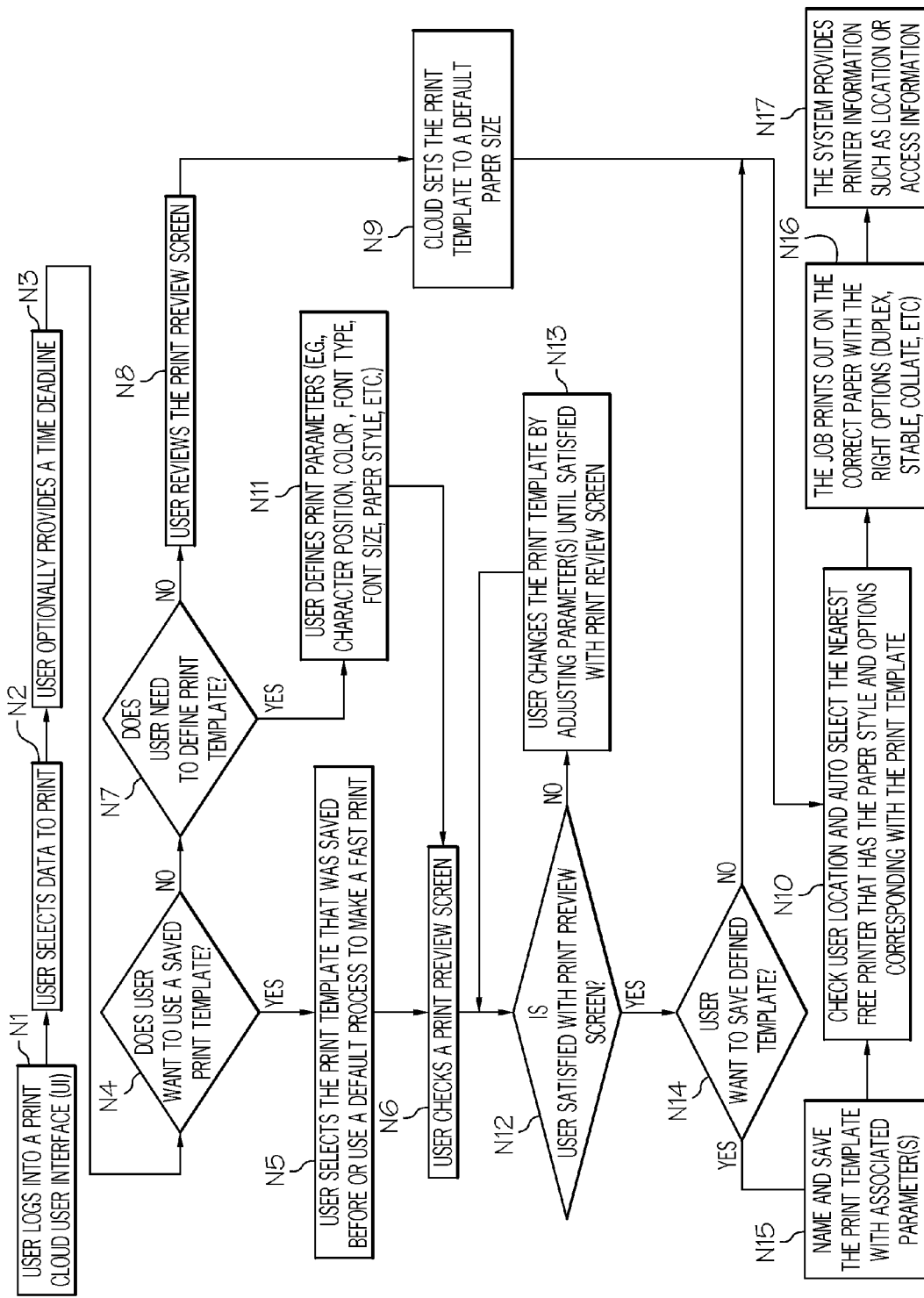
FIG. 5 depicts a method flow diagram according to an embodiment of the present invention.

Referring now to FIG. 5, a method flow diagram according to an embodiment of the present invention is shown. As depicted, in step N1, a user logs into a print cloud user interface (UI). In step N2, the user selects data to print. In step N3, the user optionally provides a time deadline (e.g., a service level commitment). In step N4, it is determined whether the user wants to use a saved print template. If so, the user selects the print template that was saved previously, or a default process/template to make a fast print (e.g., a one-click print where default settings are utilized to expedite the print job) in step N5. Then, the user may check a print preview screen in step N6. If the user did not want to use a saved print template in step N4, it will be determined in step N7 whether the user needs to define a print template. If not, the user reviews the print preview screen in step N8, the print cloud sets a template to a default paper size in step N9. Then, in step N10, the system (e.g., engine 70 of FIG. 4) checks the user location and selects (e.g., automatically) the nearest available printer that has the paper style and options corresponding to the print template.

If in step N7, the user did need to define the print template, in step N11 the user will define print parameters for items such as character position, color, font type, font size, paper style, etc. The process then flows to step N6 (described above). From step N6, it is determined in step N12 whether the user is satisfied with the print preview screen. If not, the user changes the print template by adjusting parameter(s) until the user is satisfied with the print preview screen in step N13. In step N14, it is determined whether the user wishes to save the defined print template. If not, the process may flow directly to the above-described step N10. If so, the user may name and save the print template in step N15. From step N10, the job prints out on the selected printer (i.e., on the correct paper with the correct options in step N16). In step N17, the system provides printer information for the user such as the printer's location and/or access information.

Figure 6:
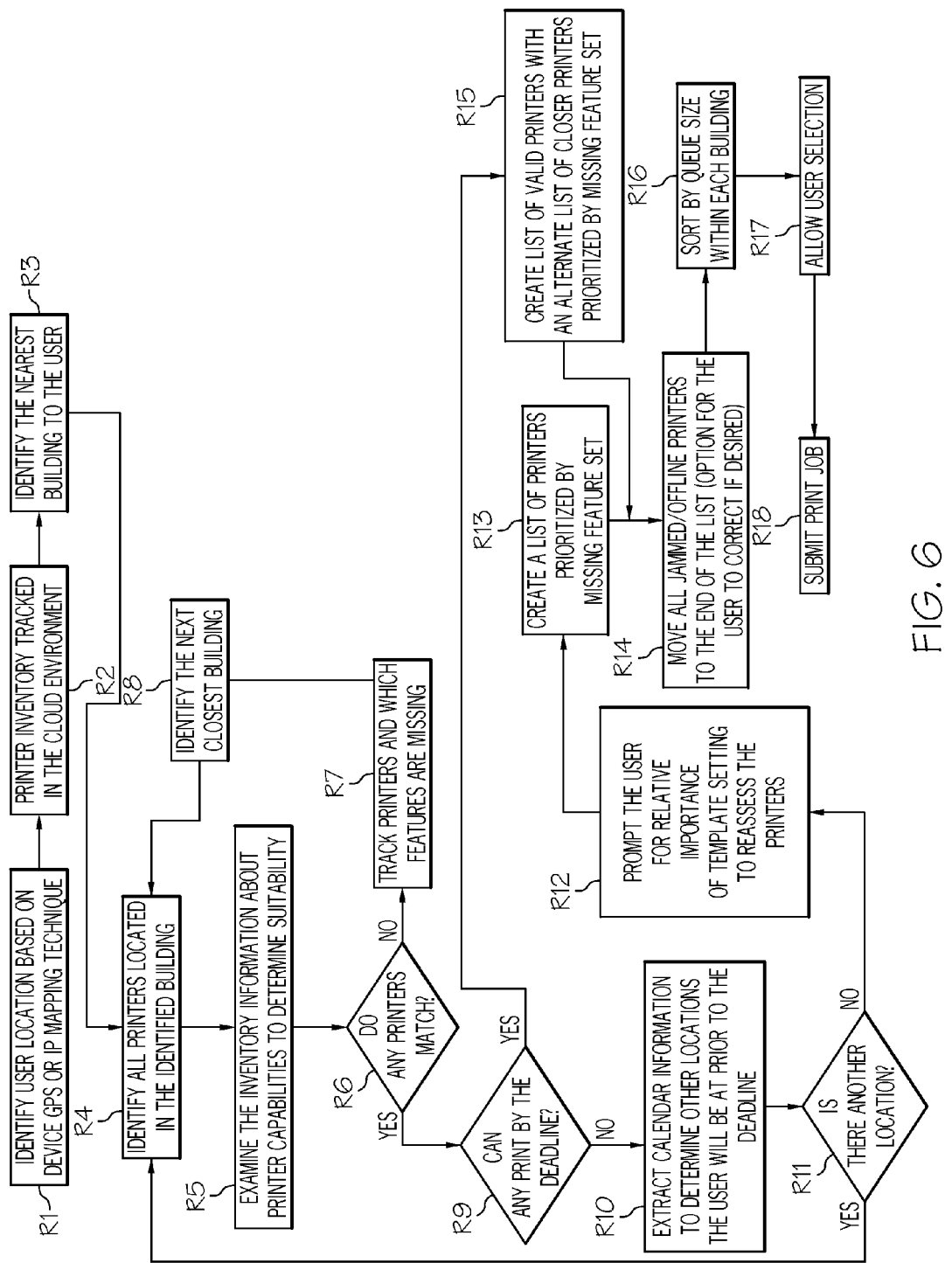
FIG. 6 depicts another method flow diagram according to an embodiment of the present invention.

Referring now to FIG. 6, a method flow diagram that further describes the details involved with step N10 is shown in greater detail. Specifically, FIG. 6 depicts a flow diagram having one or more steps that may be involved with performing step N10 of FIG. 5. In step R1, the user's location is identified (e.g., using global positioning satellite (GPS), Internet protocol (IP) mapping techniques, or using client/host name that corresponds with physical location as provided in a lookup table, etc.). In step R2, a printer inventory is tracked in the cloud environment. In step R3, the building nearest the user is identified. In step R4, all printers in the identified building are identified. In step R5, inventory information about the printers' capabilities is examined to determine the suitability of the printers. In step R6, it is determined whether any of the printers have capabilities that match the print template and service level commitments. If not, the printers are tracked, the missing features are identified in step R7, and the next closest building is identified in step R8 before the flow is returned to step R4. If it is determined in step R6 that there is a matching printer, it is then determined whether any printer can meet the user-set deadline in step R9. If not, calendar information is extracted to determine other locations that the user will be at prior to the deadline in step R10. Then, in step R11, it is determined whether there is another location. If so, the flow returns to step R4. If not, the user is prompted for relative importance of template setting to reassess the printers (e.g., may be implemented with cloud policy on priority) in step R12. Then, in step R13, a list of printers prioritized by a missing feature set is created. In step R14, all jammed/offline printers are moved to the end of the list (e.g., with the user having an option to correct as desired). If in step R9 it was determined that one or more printers could meet the deadline, a list of valid printers with an alternate list of closer printers prioritized by a missing feature set is created in step R15 (e.g., based on cloud policy settings), and the process then returns to step R14. From step R14, the list is sorted by queue size within each building in step R16, and user selection is allowed in step R17 (alternately the "best matching" printer can be selected automatically). Then, in step R18, the print job is submitted to the selected printer.

Figure 7:
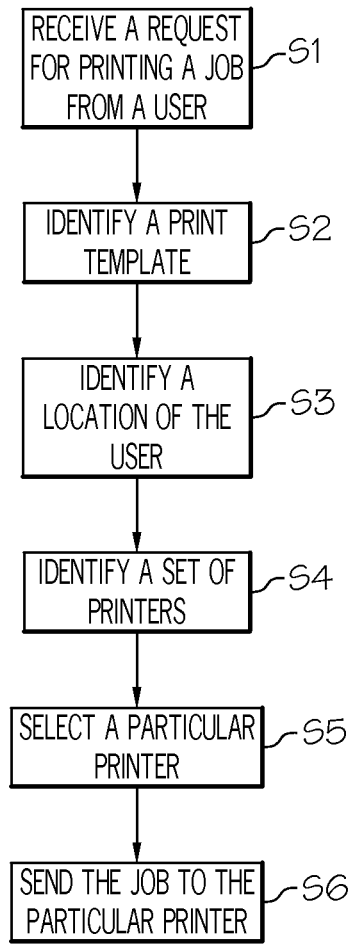
FIG. 7 depicts another method flow diagram according to an embodiment of the present invention.

Referring now to FIG. 7, a method flow diagram according to an embodiment of the present invention is shown. In step S1, a request is received for printing a job from a user in a computer memory medium. In step S2, a print template to associate with the job is identified, the print template comprising a set of parameters for printing the job. In step S3, a location of the user is identified. In step S4, a set of printers within a predetermined proximity of the location that is capable of printing the job in accordance with the set of parameters is identified. In step S5, a particular printer is selected from the set of printers based on a distance of the particular printer from the location and a set of service level commitments. In step S6, the job is sent to the particular printer.

While shown and described herein as a print service selection solution, it is understood that the invention further provides various alternative embodiments. For example, in one embodiment, the invention provides a computer-readable/useable medium that includes computer program code to enable a computer infrastructure to provide print service selection functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide print service selection functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for print service selection. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for selecting print resources in a networked computing environment, comprising:
receiving a request for printing a job from a user, the request received into a computer memory medium;
identifying a print template to associate with the job, the print template comprising a set of parameters for printing the job;
identifying a location of the user;
identifying a set of printers, within a predetermined proximity of the location, that is capable of printing the job in accordance with the set of parameters;
selecting a particular printer from the set of printers based on a distance of the particular printer from the location and a set of service level commitments; and
sending the job to the particular printer.

2. The computer-implemented method of claim 1, the set of service level commitments comprising a time limit for printing the job with the particular printer.

3. The computer-implemented method of claim 1, the set of service level commitments comprising a queue length of the particular printer.

4. The computer-implemented method of claim 1, the distance being predefined by the user.

5. The computer-implemented method of claim 1, the set of parameters comprising at least one of the following: a paper size, a page orientation, a page setup, a font type, or a color.

6. The computer-implemented method of claim 1, the print template being selected by the user from a set of print templates.

7. The computer-implemented method of claim 1, the print template being defined by the user.

8. The computer-implemented method of claim 1, the networked computing environment comprising a cloud computing environment and the set of printers being made available via one or more cloud printing services.

9. A system for selecting print resources in a networked computing environment, comprising:
a memory medium comprising instructions;
a bus coupled to the memory medium; and
a processor coupled to the bus that when executing the instructions causes the system to:
receive a request for printing a job from a user, the request received into a computer memory medium;
identify a print template to associate with the job, the print template comprising a set of parameters for printing the job;
identify a location of the user;
identify a set of printers, within a predetermined proximity of the location, that is capable of printing the job in accordance with the set of parameters;
select a particular printer from the set of printers based on a distance of the particular printer from the location and a set of service level commitments; and
send the job to the particular printer.

10. The system of claim 9, the set of service level commitments comprising a time limit for printing the job with the particular printer.

11. The system of claim 9, the set of service level commitments comprising a queue length of the particular printer.

12. The system of claim 9, the distance being predefined by the user.

13. The system of claim 9, the set of parameters comprising at least one of the following: a paper size, a page orientation, a page setup, a font type, or a color.

14. The system of claim 9, the print template being selected by the user from a set of print templates.

15. The system of claim 9, the print template being defined by the user.

16. The system of claim 9, the networked computing environment comprising a cloud computing environment and the set of printers being made available via one or more cloud printing services.

17. A computer program product for selecting print resources in a networked computing environment, the computer program product comprising a computer readable storage device, and program instructions stored on the computer readable storage device, to:
   receive a request for printing a job from a user, the request received into a computer memory medium;
   identify a print template to associate with the job, the print template comprising a set of parameters for printing the job;
   identify a location of the user;
   identify a set of printers, within a predetermined proximity of the location, that is capable of printing the job in accordance with the set of parameters;
   select a particular printer from the set of printers based on a distance of the particular printer from the location and a set of service level commitments; and
   send the job to the particular printer.

18. The computer program product of claim 17, the set of service level commitments comprising a time limit for printing the job with the particular printer.

19. The computer program product of claim 17, the set of service level commitments comprising a queue length of the particular printer.

20. The computer program product of claim 17, the distance being predefined by the user.

21. The computer program product of claim 17, the set of parameters comprising at least one of the following: a paper size, a page orientation, a page setup, a font type, or a color.

22. The computer program product of claim 17, the print template being selected by the user from a set of print templates.

23. The computer program product of claim 17, the print template being defined by the user.

24. The computer program product of claim 17, the networked computing environment comprising a cloud computing environment and the set of printers being made available via one or more cloud printing services.

25. A method for deploying a system for selecting print resources in a networked computing environment, comprising:
   providing a computer infrastructure being operable to:
      receive a request for printing a job from a user, the request received into a computer memory medium;
      identify a print template to associate with the job, the print template comprising a set of parameters for printing the job;
      identify a location of the user;
      identify a set of printers, within a predetermined proximity of the location, that is capable of printing the job in accordance with the set of parameters;
      select a particular printer from the set of printers based on a distance of the particular printer from the location and a set of service level commitments; and
      send the job to the particular printer.

* * * * *